(12) United States Patent
Ochi (10) Patent No.: US 9,361,801 B2
(45) Date of Patent: Jun. 7, 2016

(54) APPARATUS FOR MEASURING VEHICLE QUEUE LENGTH, METHOD FOR MEASURING VEHICLE QUEUE LENGTH, AND COMPUTER-READABLE RECORDING MEDIUM STORING COMPUTER PROGRAM FOR MEASURING VEHICLE QUEUE LENGTH

(75) Inventor: Mitsuru Ochi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 379 days.

(21) Appl. No.: 13/561,740

(22) Filed: Jul. 30, 2012

(65) Prior Publication Data

US 2013/0041573 A1 Feb. 14, 2013

(30) Foreign Application Priority Data

Aug. 10, 2011 (JP) ................. 2011-175083

(51) Int. Cl.
*G08G 1/00* (2006.01)
*G08G 1/08* (2006.01)
*G01S 13/34* (2006.01)
*G01S 13/58* (2006.01)
(Continued)

(52) U.S. Cl.
CPC ................ *G08G 1/08* (2013.01); *G01S 13/345* (2013.01); *G01S 13/584* (2013.01); *G01S 13/66* (2013.01); *G01S 13/91* (2013.01); *G08G 1/0116* (2013.01); *G08G 1/0133* (2013.01); *G08G 1/0145* (2013.01); *G08G 1/052* (2013.01)

(58) Field of Classification Search
CPC ............. G08G 1/07; G08G 1/00; G08G 1/95; G05D 1/00; G06G 7/76; G01C 21/00; G01C 21/26; G06F 17/14; B60W 40/04; G06Q 30/00; H04B 1/34

USPC .............. 701/1, 23, 118; 705/14.66; 340/901, 340/907, 917, 932
See application file for complete search history.

(56) References Cited

U.S. PATENT DOCUMENTS 7,860,639 B2 * 12/2010 Yang ........................ G08G 1/07
340/901
2003/0190058 A1 10/2003 Jun et al.
(Continued)

FOREIGN PATENT DOCUMENTS

DE 199 53 008 5/2001
JP 2003 -346278 12/2003
(Continued)

OTHER PUBLICATIONS

Miyamoto et al., "Analysis of Driver Characteristics in Speed Control Model", No. 3, vol. 59 of "Research in Productivity", pp. 201-204, Jun. 29, 2007.
(Continued)

*Primary Examiner* — James Trammell
*Assistant Examiner* — Sanjeev Malhotra
(74) *Attorney, Agent, or Firm* — Staas & Halsey LLP (57) ABSTRACT

An apparatus includes: a processor that executed a procedure, the procedure including: detecting a moving vehicle as the moving vehicle approaches a vehicle queue based on a signal from a sensor, acquiring a position and a speed of the moving vehicle based on the signal, calculating a stop position of the moving vehicle based on a change in the position and the speed of the moving vehicle, and calculating a length of the vehicle queue based on the stop position of the moving vehicle.

17 Claims, 7 Drawing Sheets

(51) Int. Cl.
*G01S 13/66* (2006.01)
*G01S 13/91* (2006.01)
*G08G 1/01* (2006.01)
*G08G 1/052* (2006.01)

(56) References Cited

U.S. PATENT DOCUMENTS

| | | | |
|---|---|---|---|
| 2005/0046597 A1 | 3/2005 | Hutchinson et al. | |
| 2006/0155427 A1* | 7/2006 | Yang | G08G 1/07 701/1 |
| 2007/0118282 A1 | 5/2007 | Yamamoto et al. | |
| 2008/0012726 A1* | 1/2008 | Publicover | G08G 1/095 340/932 |
| 2009/0088916 A1* | 4/2009 | Elgersma | G05D 1/101 701/23 |
| 2009/0299857 A1* | 12/2009 | Brubaker | G06Q 30/0269 705/14.66 |
| 2010/0214126 A1* | 8/2010 | Publicover | G08G 1/095 340/907 |
| 2011/0043378 A1* | 2/2011 | Bailey | G08G 1/07 340/917 |
| 2011/0205086 A1 | 8/2011 | Lamprecht et al. | |
| 2013/0151135 A1* | 6/2013 | Aubrey | G08G 1/00 701/118 |

FOREIGN PATENT DOCUMENTS

| | | | |
|---|---|---|---|
| JP | 2007-141179 | 6/2007 | |
| JP | 2007-257196 | 10/2007 | |
| JP | 2007257196 A * | 10/2007 | ............... G08G 1/01 |
| JP | 2010-44525 | 2/2010 | |
| WO | WO 2009/150528 | 12/2009 | |
| WO | WO 2010/042973 | 4/2010 | |
| ZA | WO 2009150528 A2 * | 12/2009 | ............... G08G 1/08 |

OTHER PUBLICATIONS

Korean Office Action dated Mar. 27, 2014 in Korean Patent Application No. 10-2012-0087303.
European Search Report for application No. 12178089 issued Dec. 13, 2012.
Final Office Action mailed Nov. 24, 2014 for corresponding Korean Patent Application No. 10-2012-0087303.
Korean Office Action dated Mar. 6, 2015 in corresponding Korean Patent Application No. 10-2015-0019353, 5 pages.

* cited by examiner

APPARATUS FOR MEASURING VEHICLE QUEUE LENGTH, METHOD FOR MEASURING VEHICLE QUEUE LENGTH, AND COMPUTER-READABLE RECORDING MEDIUM STORING COMPUTER PROGRAM FOR MEASURING VEHICLE QUEUE LENGTH

CROSS-REFERENCE TO RELATED APPLICATIONS

This application is based upon and claims the benefit of priority of the prior Japanese Patent Application No. 2011-175083, filed on Aug. 10, 2011, the entire contents of which are incorporated herein by reference.

FIELD

The embodiments discussed herein are related to an apparatus for measuring the length of a queue of vehicles, a method for measuring the length of a queue of vehicles, and a computer-readable recording medium storing computer program for measuring the length of a queue of vehicles based on, for example, the detection result of a vehicle position.

BACKGROUND

In order to collect information on the volume of traffic or acquire information used to control the switching of a traffic signal, a technology for measuring the length of a queue of vehicles that temporarily stop (hereinafter, simply referred to as "vehicle queue length") has been studied. See, for example, Japanese Laid-Open Patent Publication Nos. 2010-44525, 2003-346278 and 2007-141179.

For example, in a technology disclosed in Japanese Laid-Open Patent Publication No. 2010-44525, probe information acquired from a probe car is used to specify a time when the probe car passes through a vehicle detector's detection area, a time when the probe vehicle reaches the end of a vehicle queue waiting for a traffic signal, and a position that the probe vehicle reaches. The specified information, such as the time when the probe vehicle passes through the vehicle detector's detection area, the time when the probe vehicle reaches the end of the queue waiting for the traffic signal, and the position reached, are used to calculate a position of a vehicle when the vehicle having passed through the detection area reaches the end of the vehicle queue waiting at the traffic signal at a given time.

Further, Japanese Laid-Open Patent Publication No. 2003-346278 discloses a technology for measuring vehicle queue length by installing a camera so that the lens of the camera faces the same direction as the travelling direction of a vehicle and photographing an image of the road from a position behind the vehicle.

In addition, Japanese Laid-Open Patent Publication No. 2007-141179 discloses a technology where, when a brake is operated, a braking distance is obtained after obtaining an average deceleration of a vehicle to obtain a reaching position where the vehicle stops on the basis of the braking distance.

SUMMARY

According to an aspect of an illustrative embodiment of the present disclosure, an apparatus includes: a processor that executed a procedure, the procedure including: detecting a moving vehicle as the moving vehicle approaches a vehicle queue based on a signal from a sensor, acquiring a position and a speed of the moving vehicle based on the signal, calculating a stop position of the moving vehicle based on a change in the position and the speed of the moving vehicle, and calculating a length of the vehicle queue based on the stop position of the moving vehicle.

Objects and advantages of the present disclosure will be realized and attained by means of the elements and combinations particularly pointed out in the claims.

It is to be understood that both the foregoing general description and the following detailed description are illustrative and explanatory and are not restrictive of the invention, as claimed.

DESCRIPTION OF EMBODIMENT

In the technology disclosed in Japanese Laid-Open Patent Publication No. 2010-44525 as described above, a special vehicle called the probe vehicle is actually desired to pass through the vehicle detector's detection area, and accordingly the sequence of acquiring the vehicle queue length may be complicated.

In the technology disclosed in Japanese Laid-Open Patent Publication No. 2003-346278, a camera is used to photograph vehicles from behind. However, in order to install the camera, a support is desired to be installed on the road side to attach the camera.

Further, the technology disclosed in Japanese Laid-Open Patent Publication No. 2007-141179 applies to an apparatus mounted on a vehicle. As a result, the apparatus adopting the technology can predict a stop position of a vehicle that has been mounted with the apparatus. However, since the apparatus cannot identify whether another vehicle stops or not, the apparatus cannot acquire the vehicle queue length.

The present disclosure has been made in an effort to provide an apparatus for measuring the length of queued vehicles without using a special vehicle and a camera to photograph vehicles from the rear side.

Hereinafter, an apparatus for measuring vehicle queue length according to an illustrative embodiment of the present disclosure will be described with reference to the accompanying drawings.

For example, the apparatus for measuring vehicle queue length measures the length of a queue of vehicles that temporarily stop at an intersection based on a signal from a sensor that is installed near the intersection and that faces a front surface of a vehicle that approaches the intersection. The apparatus for measuring vehicle queue length estimates a stop position of a leading vehicle that is travelling ahead behind the vehicle queue based on a behavior of the leading vehicle, among vehicles that travel within the sensor's detection range, and measures the vehicle queue length based on the estimated stop position. Hereinafter, the term "vehicle queue" refers to a series of vehicles that temporarily stop at, for example, a intersection in response to, for example, a traffic signal.

Figure 1:
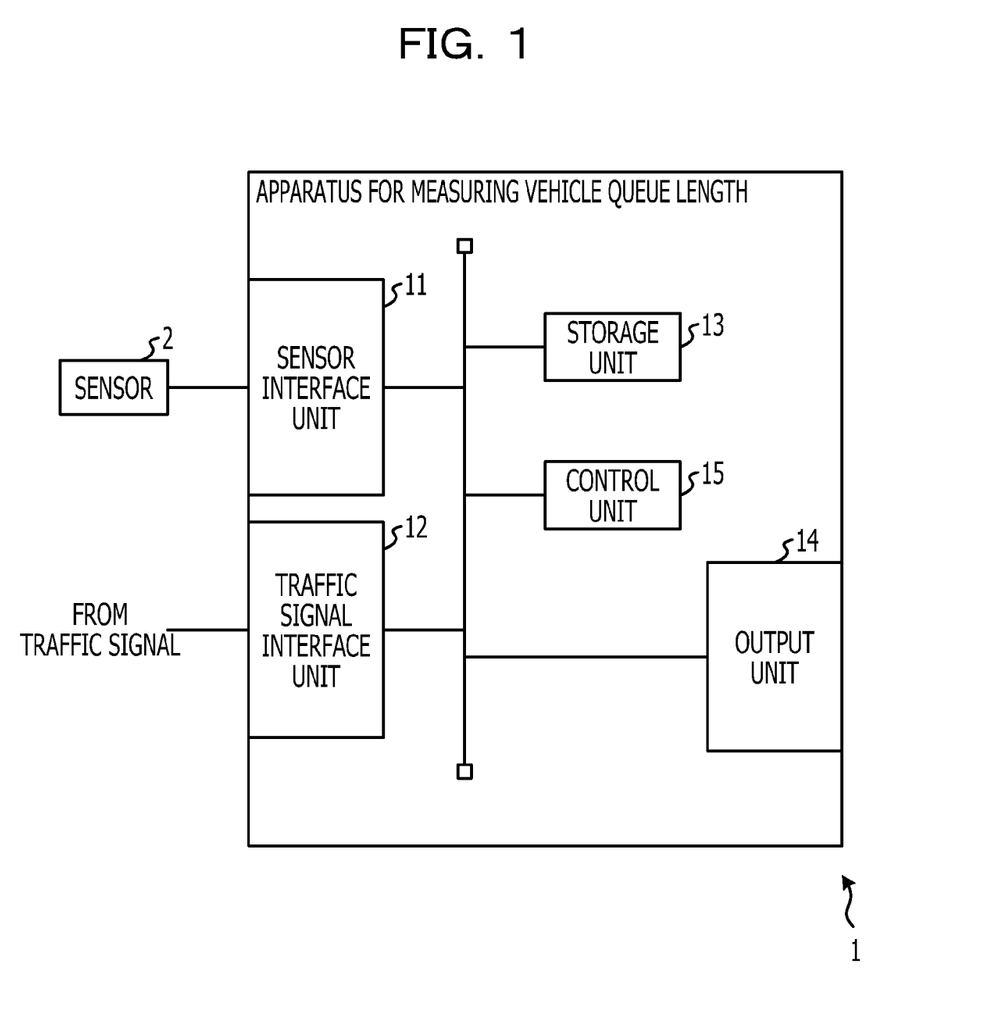
FIG. 1 depicts a schematic configuration of an apparatus for measuring vehicle queue length according to an illustrative embodiment.

FIG. 1 depicts a schematic configuration of an apparatus for measuring vehicle queue length 1 according to an illustrative embodiment. The apparatus for measuring vehicle queue length 1 includes a sensor interface unit 11, a traffic signal interface unit 12, a storage unit 13, an output unit 14, and a control unit 15. Furthermore, the apparatus for measuring vehicle queue length 1 is connected with a sensor 2 for sensing a vehicle positioned on the road through the sensor interface unit 11.

In the illustrative embodiment, the sensor 2 is a radar detector that detects an object that detects a radar wave using a frequency modulated continuous wave (FMCW) method. The sensor 2 is installed, for example, on a support, which is provided at or near an intersection and is for a traffic signal, in order to face the front surface of a vehicle that travels toward the intersection. The sensor 2 may be, for example, an existing radar detector installed to determine traffic conditions.

The sensor 2 has a transmission antenna (not shown) and a reception antenna (not shown), and the direction of the antennas are adjusted to transmit the radar wave toward the front surface of the vehicle that approaches the intersection and receive the radar wave reflected by the front surface of the vehicle.

The sensor 2 mixes a portion of the radar wave emitted from the transmitting antenna, whose frequency is varied in a triangular wave, with a reflected wave detected by the receiving antenna. Furthermore, the sensor 2 generates a beat signal that represents a difference between the frequency of the reflected wave and the frequency of the radar wave for each of an ascending section in which the frequency increases and a descending section in which the frequency decreases. The sensor 2 acquires the frequency of the reflected wave in the ascending section ($f_{up}$) and the frequency of the reflected wave in the descending section ($f_{down}$) based on the beat signal in order to calculate the distance to the object reflecting the radar wave and the speed of the object. In addition, the sensor 2 outputs at a given cycle (for example, 100 msec), for each of a plurality of positions set at given distance intervals (for example, 3 m to 10 m), a sensor signal that includes a distance up to each position from the sensor 2, a signal strength of the reflected wave, and the speed of the object at the position In the illustrative embodiment, the horizontal and vertical radiation angles of the radar wave radiated from the transmission antenna of the sensor 2 are set to cover the road that is connected with the intersection within the detection range of the sensor 2. The detection range of the sensor 2 covers from, for example, a stop line set just in front of the intersection to a position distant from the sensor 2 by 100 m to 200 m.

Further, the transmission antenna and the reception antenna of the sensor 2 may each have a directionality that radiates a radar wave toward a given direction and receives a reflected wave from the given direction. In this case, the sensor 2 may further include driving mechanisms for the transmission antenna and the reception antenna that scan a horizontal area within a given angle at a given cycle (for example, 100 msec). In this case, for each of a plurality of positions set at a given scanning angle interval and a given distance interval, the sensor 2 outputs a sensor signal that includes a distance from the sensor 2 to the position, a signal strength of the reflected wave, and the speed of an object positioned at the position.

When a vehicle is present within the detection range of the sensor 2, the radar wave radiated from the sensor 2 is obstructed by the vehicle, and as a result, there may be an area in which the sensor 2 cannot detect another vehicle. This phenomenon is called occlusion.

Figure 2A:
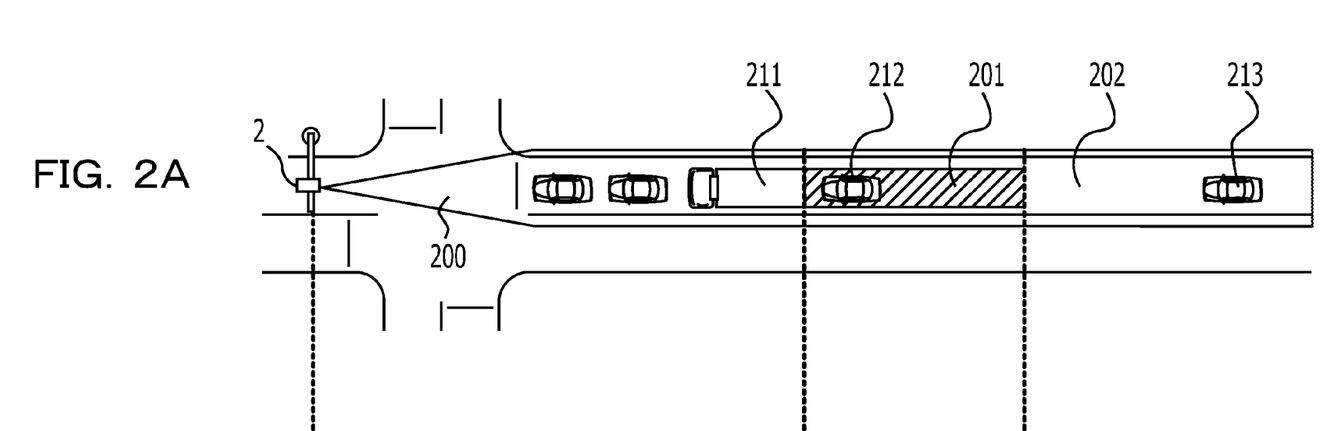
FIG. 2A depicts a plan view that is of a detection range of a sensor and illustrates an occurrence range of occlusion caused by a vehicle that travels or stops.
Figure 2B:
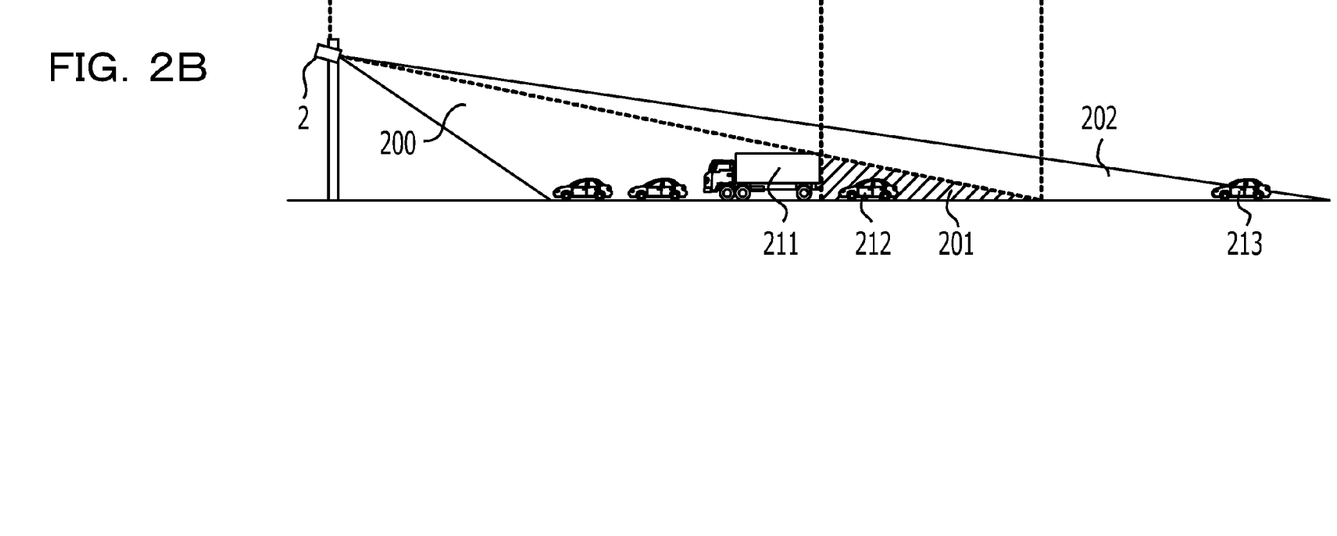
FIG. 2B depicts a side view that is of the detection range of the sensor and illustrates an occurrence range of occlusion caused by a vehicle that travels or stops.

FIG. 2A depicts a plan view of a detection range of the sensor 2 and illustrates an occurrence range of occlusion caused by a vehicle that travels or stops, and FIG. 2B depicts a side view of the detection range of the sensor 2.

In order to detect a vehicle that travels or stops on the road, the sensor 2 is installed above the vehicle and the direction of the transmission antenna of the sensor 2 is adjusted to radiate the radar wave obliquely downward, and as a result, a detection range 200 of the sensor 2 includes an area from just in front of the intersection to a given distance along the road. In this case, since the radar wave toward a rear area 201 of the vehicle 211 is occluded by a vehicle 211, the sensor 2 may not detect a vehicle 212 that is positioned within the area 201, that is, occlusion occurs in the area 201. Furthermore, the larger the vehicle 211 is, the area in which the sensor 2 fails to detect the vehicle also increases, and in some cases, the length of the area 201 may be approximately 40 m. In addition, when the tail end of a vehicle queue is positioned within the area 201, the sensor 2 may not detect a vehicle that is positioned at the tail end of the vehicle queue.

However, since the radar wave reaches an area 202 that is further behind the area 201, the sensor 2 may detect a vehicle 213 positioned within the area 202. When the vehicle 213 reaches the tail end of the vehicle queue, the vehicle 213 also stops. As a result, the behavior of the vehicle 213 may be used to specify the position of the tail end of the vehicle queue.

Therefore, the apparatus for measuring vehicle queue length 1 detects the first vehicle that travels within the detection range of the sensor 2 and measures the vehicle queue length based on the behavior of the vehicle.

The sensor interface unit 11 includes an interface circuit to connect the apparatus for measuring vehicle queue length 1 with the sensor 2. The sensor interface unit 11 may be, for example, a circuit compatible with a serial communication standard such as RS-232C or a universal serial bus (USB), or a circuit compatible with Ethernet (registered trademark). The sensor interface unit 11 transfers a sensor signal to the control unit 15 each time a sensor signal is received from the sensor 2.

The traffic signal interface unit 12 has an interface circuit to connect the apparatus for measuring vehicle queue length 1 with a traffic signal (not shown). The interface unit may be, for example, a circuit compatible with a serial communication standard such as RS-232C or a universal serial bus (USB), or a circuit compatible with Ethernet (registered trademark). The traffic signal interface unit 12 is installed near the sensor 2 and may acquire timing information that indicates a traffic signal switching time from a traffic signal that regulates the passage of vehicles on the road included within the detection range of the sensor 2. Alternatively, the traffic signal interface unit 12 may output a measured value of the vehicle queue length received from the control unit 15 to the traffic signal.

The storage unit 13 includes, for example, a readable/writable semiconductor memory circuit and a read-only semiconductor memory circuit. Further, the storage unit 13 is used to measure the vehicle queue length and stores a computer program that runs on the control unit 15. In addition, the storage unit 13 also stores various data used to measure the vehicle queue length such as, for example, the sensor signal received from the sensor 2 and tracking information of a vehicle detected based on the sensor signal.

The output unit 14 includes an interface circuit to connect the apparatus for measuring vehicle queue length 1 with another apparatus such as, for example, a traffic management system. The interface circuit may be configured to be compatible with Ethernet (registered trademark). The output unit 14 outputs information on the vehicle queue length received from the control unit 15 to another apparatus.

The control unit 15 controls the apparatus for measuring vehicle queue length 1. Furthermore, the control unit 15 acquires the length of a queue of vehicles that stop on the road within the detection range of the sensor 2 based on the sensor signal received from the sensor 2. To this end, the control unit 15 includes at least one processor, a timer and a peripheral circuit.

Figure 3:
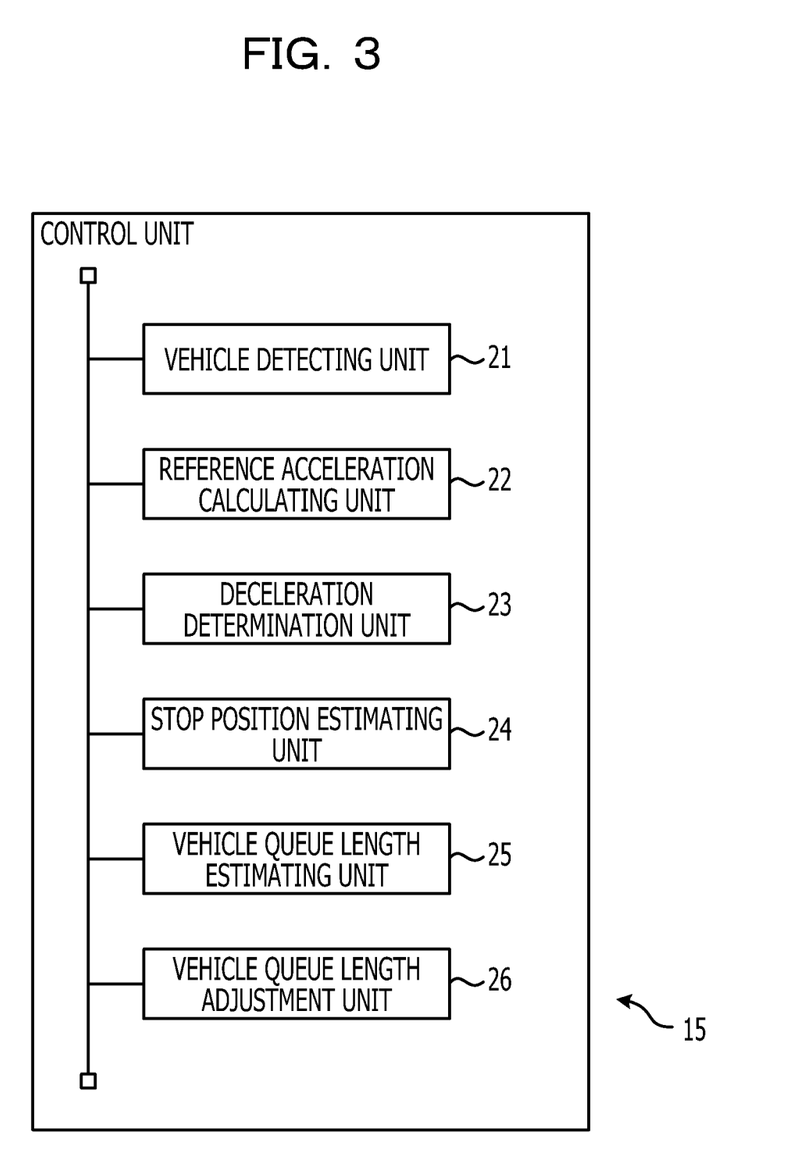
FIG. 3 depicts a functional block diagram of a control unit.

FIG. 3 depicts a functional block diagram of the control unit 15. The control unit 15 includes a vehicle detecting unit 21, a reference acceleration calculating unit 22, a deceleration determination unit 23, a stop position estimating unit 24, a vehicle queue length estimating unit 25 and a vehicle queue length adjusting unit 26, each of which is a functional module implemented by a computer program that is executed on a processor of the control unit 15. Alternatively, each of the vehicle detecting unit 21, the reference acceleration calculating unit 22, the deceleration determination unit 23, the stop position estimating unit 24, the vehicle queue length estimating unit 25 and the vehicle queue length adjusting unit 26 may be implemented in the apparatus for measuring vehicle queue length 1 as an individual circuit.

Each time the control unit 15 receives a sensor signal from the sensor 2, the vehicle detecting unit 21 detects a vehicle that travels or stops within the detection range of the sensor 2 based on the sensor signal. Furthermore, at each detection time, the vehicle detecting unit 21 determines the position and the speed of the vehicle at the detection time.

For example, the vehicle detecting unit 21 compares a threshold corresponding to a signal strength, for when there is no object to be detected with the signal strength of the reflected wave, for each of the plurality of positions included in the sensor signal. The vehicle detecting unit 21 determines that a vehicle is present at a position where the signal strength is larger than the threshold. In addition, the vehicle detecting unit 21 sets a speed corresponding to a position where the vehicle is detected as the speed of the detected vehicle.

The vehicle detecting unit 21 also tracks the detected vehicle. For example, the vehicle detecting unit 21 may estimate the position of the detected vehicle at the latest acquisition time of a sensor signal, by subtracting, from the position of the detected vehicle based on a sensor signal acquired a given number of times beforehand, a distance acquired by multiplying an elapsed time, which is the time from when the sensor signal was acquired a given number of times beforehand until the time when the latest sensor signal was acquired, by the speed of the detected vehicle. Alternatively, the vehicle detecting unit 21 may estimate the position of the detected vehicle when the latest sensor signal is acquired, based on a past sensor signal and according to a vehicle's behavior model (for example, a constant acceleration motion model), to be described below. When a plurality of vehicles are detected based on the sensor signal acquired the given number of times before, the vehicle detecting unit 21 estimates the position of each vehicle when the latest sensor signal is acquired. Further, the vehicle detecting unit 21 specifies, based on the latest sensor signal, an estimated position of a vehicle that is positioned closest to the position of the detected vehicle. The vehicle detecting unit 21 determines that the vehicle detected based on the latest sensor signal is the same as the vehicle corresponding to the specified estimated position.

The vehicle detecting unit 21 may estimate the position and the speed of a vehicle detected based on a past sensor signal when acquiring the latest sensor signal, according to the vehicle's behavior model. In this case, the vehicle detecting unit 21 determines that the vehicle detected based on the latest sensor signal is the same as a vehicle that corresponds to the estimated position and the estimated speed that are closest to the position and the speed of the vehicle detected. For a vehicle detected based on the latest sensor signal, the vehicle detecting unit 21 determines that the vehicle detected is a new vehicle detection when there is no estimated position, based on the past sensor signal, for the vehicle detected within a given range from the position of the vehicle detected and in an area behind the position of the vehicle detected. The vehicle detecting unit 21 allocates an identification number to the newly detected vehicle to distinguish the newly detected vehicle from another vehicle that has already been detected.

The vehicle detecting unit 21 stores a set of information that includes a time, the position, and the speed of the vehicle when the sensor signal is acquired as well as the allocated identification number for each detected vehicle in the storage unit 13 as tracking information. While the vehicle is being detected, a set of a time, the position and the speed of the vehicle when the sensor signal is acquired, which are acquired whenever the sensor signal is acquired, is added to the vehicle's tracking information.

The vehicle detecting unit 21 determines a specified vehicle among the detected vehicles to estimate the vehicle queue length. In the present embodiment, the apparatus for measuring vehicle queue length 1 measures the vehicle queue length based on a behavior of a vehicle that may be likely to reach the tail end of the vehicle queue. Therefore, the vehicle detecting unit 21 specifies a leading vehicle closest to the sensor 2 among vehicles that do not have zero (0) speed and also approach the sensor 2, that is, the leading vehicle that travels ahead among vehicles that are positioned behind the vehicle queue based on the position and the speed included in the tracking information for each vehicle. The vehicle detecting unit 21 sets the specified vehicle and adds a specified flag to the tracking information of the specified vehicle.

The vehicle detecting unit 21 determines that the specified vehicle stops when the speed of the specified vehicle at the latest time is, for example, 5 km/h or less, which is included in the tracking information of the vehicle in which the specified flag is set. Alternatively, as described below, when the specified vehicle is estimated to reach a stop position that is estimated by the stop position estimating unit 24, the vehicle detecting unit 21 may determine that the specified vehicle stops. Further, the vehicle detecting unit 21 removes the specified flag from the tracking information of the specified vehicle that stops.

When the vehicle detecting unit 21 cannot detect a vehicle that has already been detected for a given time period, the vehicle detecting unit 21 determines that the vehicle is out of the detection range of the sensor 2 and deletes the tracking information for the vehicle from the storage unit 13. Alternatively, the vehicle detecting unit 21 may remove the tracking information for the vehicle from the storage unit 13 after the already detected vehicle stops, or after a given time period elapses from a time that the already detected vehicle was estimated to have stopped. The given time period is set to, for example, a cycle of the traffic signal directed toward the road where the vehicle queue length is acquired.

When the road within the detection range of the sensor 2 is on a hill, a vehicle that travels on the road may accelerate or decelerate even if the corresponding vehicle does not intend to stop. As a result, even if the vehicle within the detection range of the sensor 2 is decelerating, whether the vehicle intends to stop is indefinite. Meanwhile, while the traffic signal shows a green signal, that is, during a period in which the traffic signal permits movement toward the sensor 2, it is estimated that a vehicle travelling within the detection range of the sensor 2 intends to pass through the intersection where the traffic signal is installed without stopping.

Therefore, the reference acceleration calculating unit 22 specifies a green signal period based on the timing information acquired from the traffic signal. The reference acceleration calculating unit 22 acquires a representative value for the acceleration of each vehicle from the change in speed of each vehicle, which is detected within the green signal period just after the given green signal period ends. The reference acceleration calculating unit 22 sets the representative value of the acceleration as a reference acceleration to determine whether the vehicle travelling within the detection range of the sensor 2 is decelerating in order to stop.

For example, the reference acceleration calculating unit 22 divides the difference between vehicle velocities at respective times for each set of two consecutive times by the difference between the times for each vehicle detected within the green signal period, by referring to the tracking information for each vehicle detected within the green signal period, thereby acquiring the acceleration of the vehicle in the set of the times. Furthermore, the reference acceleration calculating unit 22 sets a mean, a mode, or a median of the vehicle acceleration of each set, as the acceleration of the vehicle. Alternatively, the reference acceleration calculating unit 22 applies the method of least squares based on a speed at each time when the vehicle is detected by referring to the tracking information for each vehicle detected within the green signal period, thereby acquiring the acceleration of the vehicle. The reference acceleration calculating unit 22 stores the mean, the median, or the mode of the acceleration of each vehicle in the storage unit 13 as a reference acceleration $A_{std}$.

When there is no detected vehicle within the latest green signal period, the storage unit 13 stores the reference acceleration $A_{std}$ that was acquired during a green signal period earlier than the latest green signal period. The reference acceleration calculating unit 22 may acquire each of accelerations for vehicles detected during any one of a plurality of green signal periods and set the mean, the median, or the mode of the acceleration of each vehicle as the reference acceleration $A_{std}$.

The reference acceleration calculating unit 22 may calculate the reference acceleration $A_{std}$ by only tracking information of a vehicle during a second half of the green signal period. As a result, when a red signal is changed to a green signal, the acceleration when a stopped vehicle starts accelerating does not influence the reference acceleration $A_{std}$, and as a result, the reference acceleration calculating unit 22 may more appropriately determine the reference acceleration $A_{std}$.

Furthermore, the vehicle may decelerate due to a vehicle queue that starts at an intersection in front of the intersection where the sensor 2 is installed. In this case, the reference acceleration calculating unit 22 may use only tracking information of a vehicle that is distant from the intersection that is in front of the sensor 2 in order to more appropriately determine the reference acceleration $A_{std}$. Therefore, the reference acceleration calculating unit 22 may acquire the reference acceleration $A_{std}$ using only tracking information of a vehicle detected at an area which is further away from the center of the detection range of the sensor 2.

The reference acceleration calculating unit 22 determines a deceleration determination threshold $A_{th}$ and stores the determined deceleration determination threshold $A_{th}$ in the storage unit 13. The deceleration determination threshold $A_{th}$ is a value acquired by adding a marginal value $A_{margin}$ that has a minus value to the reference acceleration $A_{std}$. The marginal value $A_{margin}$ is, for example, set as a value that corresponds to a width of a deviation of the acceleration of the vehicle when the vehicle travels without stopping. For example, when a standard deviation of the acceleration is set as σ when calculating the reference acceleration $A_{std}$, the marginal value $A_{margin}$ is set as a value corresponding to -2σ to -σ.

The deceleration determination unit 23 specifies a period in which the traffic signal shows the red signal in order to prohibit a vehicle from passing through the intersection, that is, a movement control period in which the traffic signal regulates movement in a direction towards the sensor 2, based on timing information received from the traffic signal. Each time the control unit 15 receives a sensor signal from the sensor 2 and the tracking information of the specified vehicle is updated during the movement control period, that is, during the red signal period, the deceleration determination unit 23 acquires the acceleration of the specified vehicle from the change in position and speed of the specified vehicle, based on the tracking information. The deceleration determination unit 23 may perform similar processing as the processing in which the reference acceleration calculating unit 22 acquires the acceleration of each vehicle and calculate the acceleration of the specified vehicle. The deceleration determination unit 23 adds the acquired acceleration to the tracking information of the specified vehicle.

The deceleration determination unit 23 compares the acceleration of the specified vehicle with the deceleration determination threshold $A_{th}$ whenever the acceleration of the specified vehicle is acquired. When the acceleration of the specified vehicle is less than the deceleration determination threshold $A_{th}$, the deceleration determination unit 23 determines that the specified vehicle is decelerating in order to stop.

Figure 4:
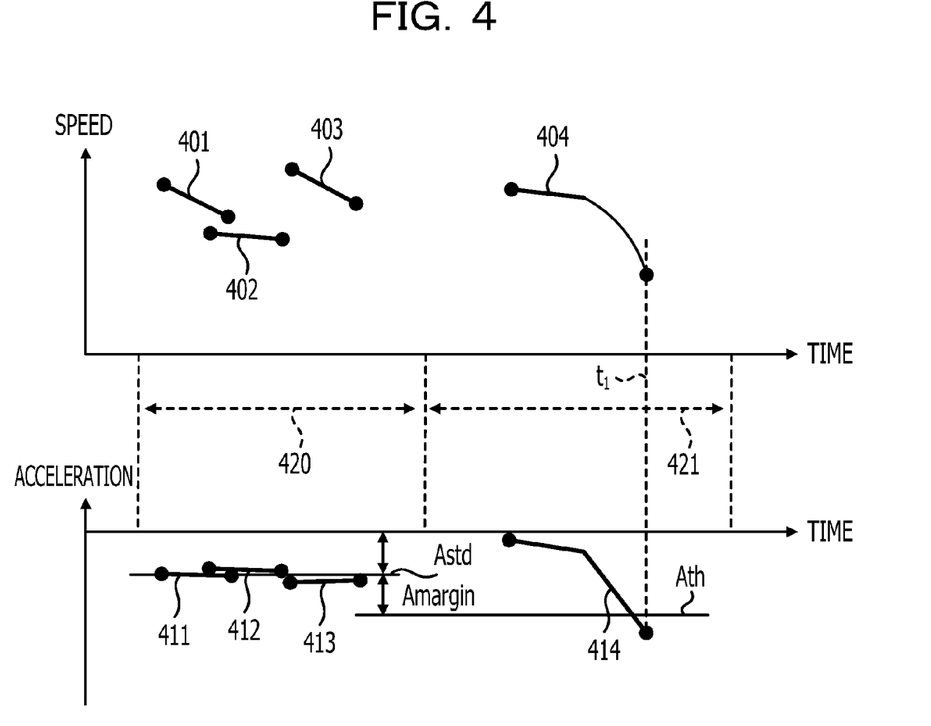
FIG. 4 depicts a diagram illustrating the relationship between a deceleration determination threshold and a reference acceleration that are acquired from an acceleration of each vehicle detected during a green signal period, and an acceleration of a specified vehicle detected during a red signal period.

FIG. 4 depicts a diagram illustrating the relationship between both the deceleration determination threshold $A_{th}$ and the reference acceleration $A_{std}$ acquired from the acceleration of each vehicle detected during the green signal period, and the acceleration of the specified vehicle detected during the red signal period.

In FIG. 4, the horizontal axis represents the time. The vertical axis of the upper graph represents the speed of the detected vehicle and the vertical axis of the lower graph represents the acceleration of the detected vehicle. When the vehicle is decelerating, the acceleration of the vehicle has a minus value.

Each of lines 401 to 403 in the upper graph represents the variation over time of the speed of a vehicle speed detected during a green signal period 420. Each of lines 411 to 413 in the lower graph represents the variation over time of the acceleration of the vehicle corresponding to the lines 401 to 403, respectively. The reference acceleration calculating unit 22 sets a statistical value of the accelerations represented by the lines 411 to 413, for example, a mean value of the accelerations as the reference acceleration $A_{std}$, and sets a value acquired by adding a minus marginal value $A_{margin}$ to the reference acceleration $A_{std}$ as the deceleration determination threshold $A_{th}$.

The line 404 in the upper graph represents the variation over time of the speed of the specified vehicle detected during a red signal period 421. A line 414 in the lower graph represents the variation over time of the acceleration of the specified vehicle. As indicated by the line 414, the acceleration of the specified vehicle becomes lower than the deceleration determination threshold $A_{th}$ at time $t_1$. Therefore, in this example, the deceleration determination unit 23 determines that the specified vehicle is decelerating to stop at time $t_1$.

When it is determined that the specified vehicle is decelerating to stop, the deceleration determination unit 23 notifies the stop position estimating unit 24 that the specified vehicle is decelerating to stop.

The stop position estimating unit 24 estimates the stop position of the specified vehicle based on the tracking information and the model that expresses the behavior of the vehicle. The model expressing the behavior of the vehicle may be a constant acceleration motion model. In this case, the stop position estimating unit 24 estimates a stop position $L_x$ of the specified vehicle, based on the stop line and according to equation 1 given below.

$$L_x = s_1 - \Delta S - D_s$$

$$\Delta S = v_1^2 / (2a_1)$$ [Equation 1]

In the above equation, each of $s_1$, $v_1$, and $a_1$ represents the position, the speed, and the acceleration, respectively, of the specified vehicle at time $t_1$. $\Delta S$ represents a distance from the position $s_1$ of the specified vehicle to an estimated stop position of the specified vehicle at time $t_1$. $D_s$ represents, for example, a distance from an installation position of the sensor 2 up to the stop line of the intersection, which is the start of the vehicle queue.

The stop position estimating unit 24 may acquire the estimated stop position $L_x$ of the specified vehicle according to another model that expresses the behavior of the vehicle, for example, the Chandler model, the Newell model, an inter-vehicular time constant model, or a linear feedback model. The models are disclosed in, for example, "Analysis of Driver Characteristics in Speed Control Models" by Miyamoto et al., p. 201-204, No. 3, Volume 59 of "Research in Productivity" in 2007.

The stop position estimating unit 24 may update the estimated stop position $L_x$ of the specified vehicle based on the latest tracking information whenever the tracking information is updated up to the time when the specified vehicle stops or when the traffic signal changes to green.

When the specified vehicle cannot be detected by the sensor 2 due to a vehicle positioned in front of the specified vehicle, the stop position estimating unit 24 sets the estimated stop position $L_x$ acquired just before the specified vehicle could not be detected as a final estimated stop position. As a result, the stop position estimating unit 24 may estimate the stop position of the specified vehicle even if occlusion occurs.

The vehicle queue length estimating unit 25 estimates the length of a queue of vehicles that have temporarily stopped based on the estimated stop position $L_x$ of the specified vehicle. In general, when a travelling vehicle reaches the tail end of a vehicle queue, the travelling vehicle stops with a certain inter-vehicular distance from the vehicle that is stopped at the tail end of the vehicle queue in order to prevent a collision. Therefore, as shown in an equation described below, the vehicle queue length estimating unit 25 sets a value acquired by subtracting an estimated value $D_w$, which is an inter-vehicular distance for stopped vehicles, from the estimated stop position $L_x$ of the specified vehicle, as the vehicle queue length L. The estimated value $D_w$ that is the inter-vehicular distance for stopped vehicles is set to, for example, 5 m to 10 m.

$$L = L_x - D_w$$ [Equation 2]

Figure 5:
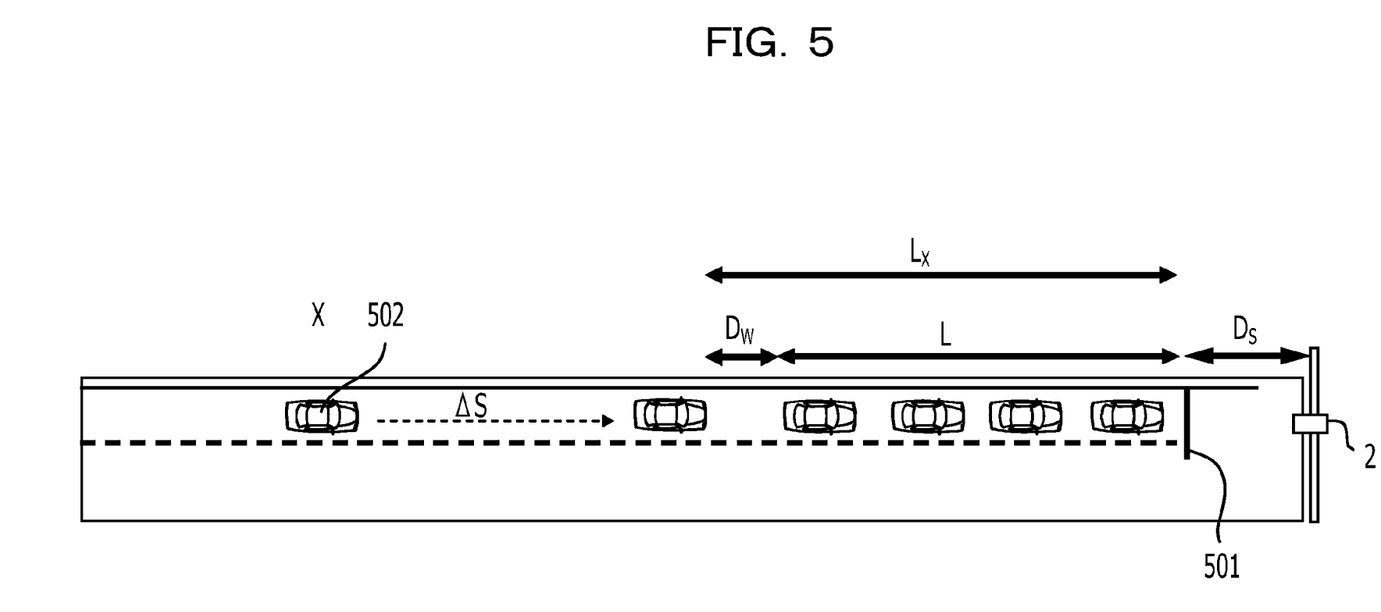
FIG. 5 depicts a diagram illustrating the relationship between an estimated stop position of the specified vehicle and the vehicle queue length.

FIG. 5 is a diagram illustrating the relationship between the estimated stop position of the specified vehicle and the vehicle queue length. The front of the vehicle queue corresponds to a stop line 501 positioned separated from the sensor 2 by a distance $D_s$. If a specified vehicle 502 is detected at a position x at time $t_1$, it is estimated that the specified vehicle 502 stops at the position $L_x$ that is in front of the position x by the distance $\Delta S$. y. Therefore, the length of the vehicle queue L is a value acquired by subtracting the inter-vehicular distance $D_w$ for stopped vehicles from $L_x$.

The vehicle queue length estimating unit 25 need not to estimate the vehicle queue length when the deceleration determination unit 23 determines that the specified vehicle is not decelerating, that is, when the acceleration of the specified vehicle is greater than or equal to the deceleration determination threshold $A_{th}$. Thereafter, similarly, the vehicle queue length estimating unit 25 determines whether to estimate the vehicle queue length or to defer estimation according to a result of a comparison of the acceleration of the specified vehicle, which is calculated based on the next sensor signal to be received from the sensor 2, and the deceleration determination threshold $A_{th}$, which is determined by the deceleration determination unit 23.

Before the deceleration determination unit 23 determines that the specified vehicle has decelerated, for example, when the specified vehicle is not detected because the specified vehicle enters into an area where occlusion occurs, the vehicle queue length estimating unit 25 may set the vehicle queue length as a value acquired for a vehicle one vehicle before the specified vehicle. Alternatively, the vehicle queue length estimating unit 25 may perform the same processing as in the vehicle queue length adjusting unit 26 to be described below to estimate the vehicle queue length.

The vehicle queue length estimating unit 25 may output the acquired vehicle queue length L to another apparatus through the output unit 14 as well as storing the acquired vehicle queue length L in the storage unit 13. Alternatively, the vehicle queue length estimating unit 25 may output the vehicle queue length L to the traffic signal through the traffic signal interface unit 12.

Even if a given time $T_{wait}$ elapses from the time when a vehicle last set as the specified vehicle cannot be detected by the sensor 2, a vehicle travelling behind the last specified vehicle may not be detected by the sensor 2. In this case, the vehicle queue length adjusting unit 26 adjusts the vehicle queue length that is estimated based on the last specified vehicle, by assuming that the last specified vehicle stops at the tail end of the vehicle queue. The given time $T_{wait}$ is set to, for example, from the time when the vehicle set as the last specified vehicle is last detected, a time desired for the last specified vehicle to stop, when the last specified vehicle slows down at a constant acceleration, and is acquired by, for example, equation 3 given below.

$$T_{wait} = v_2 / |a_2|$$ [Equation 3]

In the equation 3 above, $a_2$ and $v_2$ represent the acceleration and the speed, respectively, of the last specified vehicle at the time $t_2$, which is when the vehicle set as the last specified vehicle is finally detected.

The vehicle queue length adjusting unit 26 acquires the vehicle queue length after adjustment L' according to equation 4 given below.

$$L'=L+D_w+D_x \quad \text{[Equation 4]}$$

In the equation 4 above, L, $D_w$, and $D_x$ represent the vehicle queue length before adjustment, the estimated value of the inter-vehicular distance when stopped, and the estimated value of the length of the vehicle set as the last specified vehicle, respectively. The estimated value $D_x$ of the length of the vehicle is set as the length of a general vehicle, for example, 4 m to 10 m.

The vehicle queue length adjusting unit 26 may set the vehicle queue length after adjustment L' to a value acquired by adding $D_x$ to the estimated stop position $L_x$ of the specified vehicle acquired at the last detected time, which is calculated according to Equation 1.

Figure 6:
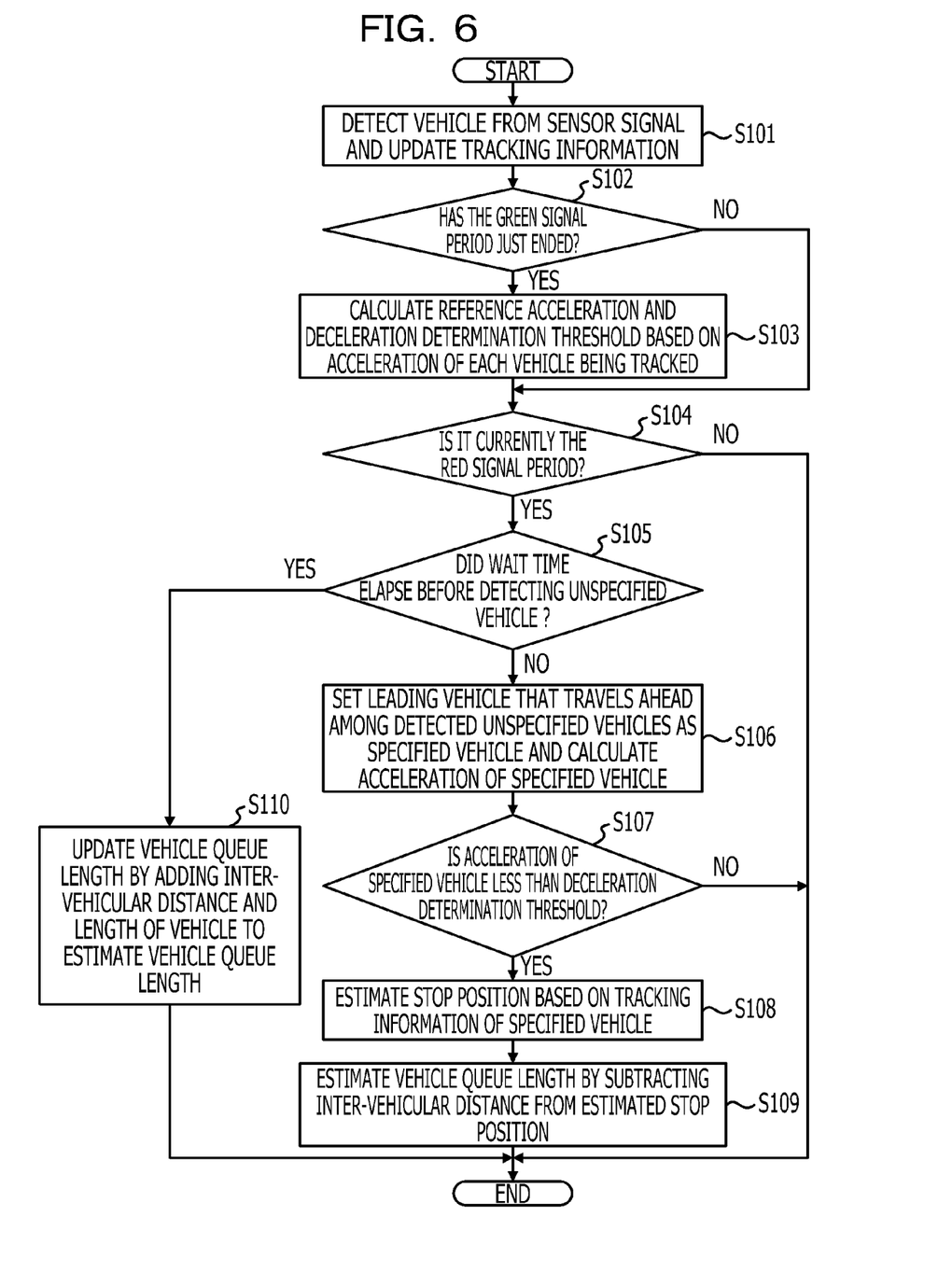
FIG. 6 illustrates an operational flowchart for measuring the vehicle queue length.

FIG. 6 illustrates an operational flowchart for measuring vehicle queue length as performed by the control unit 15. The control unit 15 performs measurement processing of the vehicle queue length according to the operational flowchart each time a sensor signal from the sensor 2 is acquired.

The vehicle detecting unit 21 of the control unit 15 detects a vehicle in the sensor signal (step S101). The vehicle detecting unit 21 utilizes the position of the vehicle detected based on the latest sensor signal and the position of the vehicle detected based on a past sensor signal to update the tracking information of each vehicle.

The control unit 15 determines whether the green signal period has ended based on timing information acquired from the traffic signal through the traffic signal interface unit 12 (step S102).

When the green signal period is determined to have just ended ("Yes" in step S102), the reference acceleration calculating unit 22 of the control unit 15 acquires the reference acceleration $A_{std}$ from the change in speed of each vehicle during the green signal period, based on the detected tracking information of each vehicle (step S103). The reference acceleration calculating unit 22 determines the deceleration determination threshold $A_{th}$ based on the reference acceleration $A_{std}$, and stores the reference acceleration $A_{std}$ and the deceleration determination threshold $A_{th}$ in the storage unit 13.

When the green signal period is determined to have not just ended ("No" in step S102) or after step S103, the control unit 15 determines whether the red signal is current based on the timing information (step S104). When it is determined that the red signal period is not current ("No" in step S104), the control unit 15 completes the measurement processing of the vehicle queue length without measuring the vehicle queue length.

Meanwhile, when it is determined that the red signal is current ("Yes" in step S104), the control unit 15 determines whether the wait time $T_{wait}$ has elapsed before detecting a vehicle travelling behind the vehicle queue that is not set as the specified vehicle (step S105). When it is determined that there is a vehicle among the travelling vehicles detected by the vehicle detecting unit 21 that is not set as the specified vehicle ("No" in step S105), the deceleration determination unit 23 of the control unit 15 sets as the specified vehicle the leading vehicle that travels ahead among unspecified vehicles. The deceleration determination unit 23 calculates an acceleration $A_{int}$ of the specified vehicle based on the tracking information of the specified vehicle (step S106). The deceleration determination unit 23 determines whether the acceleration $A_{int}$ of the specified vehicle is lower than the deceleration determination threshold $A_{th}$ (step S107). When the acceleration $A_{int}$ of the specified vehicle is greater than or equal to the deceleration determination threshold $A_{th}$ ("No" in step S107), the deceleration determination unit 23 determines that the specified vehicle is not decelerating in order to stop. In this case, the control unit 15 completes the measurement processing of the vehicle queue length without measuring the vehicle queue length.

When the acceleration $A_{int}$ of the specified vehicle is lower than the deceleration determination threshold $A_{th}$ ("Yes" in step S107), the deceleration determination unit 23 determines that the specified vehicle is decelerating in order to stop. In this case, the stop position estimating unit 24 of the control unit 15 estimates the stop position of the specified vehicle based on the tracking information of the specified vehicle (step S108). The vehicle queue length estimating unit 25 estimates the vehicle queue length by subtracting the inter-vehicular distance from the estimated stop position of the specified vehicle (step S109).

When it is determined that the wait time $T_{wait}$ has elapsed before detecting a vehicle that is not set as the specified vehicle ("Yes" in step S105), the vehicle queue length adjusting unit 26 of the control unit 15 updates the vehicle queue length by adding the inter-vehicular distance and the length of the vehicle to the vehicle queue length estimated based on the prior stop position of the specified vehicle (step S110).

After step S109 or S110, the control unit 15 completes the measurement processing of the vehicle queue length.

As described above, the apparatus for measuring vehicle queue length measures the vehicle queue length using the sensor installed to face the travelling direction of a vehicle. As a result, the apparatus for measuring the train length of vehicles may use an existing sensor. The apparatus for measuring vehicle queue length estimates the stop position of the vehicle based on the behavior of a vehicle that travels behind an area where occlusion may occur, and thus, may measure the vehicle queue length even if occlusion occurs.

The apparatus for measuring vehicle queue length disclosed in this specification may measure vehicle queue length without using a special vehicle and a camera to photograph vehicles from behind.

The present disclosure is not limited to the illustrative embodiment. According to a modified example, the sensor may be an image sensor. In this case, the sensor generates an image by photographing both the road where the vehicle queue length is to be measured and the vehicles on the road at a given cycle. The sensor may transfer the image to the control unit whenever an image is generated.

The vehicle detecting unit of the control unit detects a vehicle on the road by detecting a vehicle photographed in the image received from the sensor. As a result, the vehicle detecting unit performs, for example, background difference processing between the image received from the sensor and a background image acquired by photographing the road when there is no vehicle traveling on the road, which is previously stored in the storage unit. The vehicle detecting unit detects, on the difference image that is acquired by the background difference processing, a set of pixels that have an absolute value that is more than a given threshold as an area where a vehicle has been photographed. Alternatively, the vehicle detecting unit acquires a normalized cross-correlation value by performing template matching between at least one template indicating the vehicle and the image, and then determines that the vehicle is photographed in an area of the image in which the normalized cross-correlation value is more than a given value.

Since the position on the image and the position on the road correspond to each other one to one, the vehicle detecting unit may calculate a distance from the sensor to the detected vehicle based on a center of gravity of the area in the image in which the vehicle is detected.

When a radar detector is used as the sensor, if a portion of the specified vehicle is hidden by another vehicle, the signal strength of the reflected wave decreases depending on the size of the hidden portion. And, as a result, it may become difficult for the vehicle detecting unit to detect the specified vehicle. However, when an image sensor is used as the sensor, even when a portion of the specified vehicle is hidden by another vehicle, the vehicle detecting unit may detect the vehicle by detecting the unhidden part of the specified vehicle on the image. As a result, the apparatus for measuring vehicle queue length may reduce the area where occlusion occurs by using an image sensor.

According to another modified example, the sensor may be a radar apparatus configured with a pulse compression method or a two-frequency continuous wave (CW) method. In this case, the control unit receives from the sensor at a given cycle sensor signals that include signal strengths of reflected waves for each of a plurality of positions set with a given distance interval. The vehicle detecting unit determines that the vehicle is present at a distant position where the signal strength of the reflected wave is greater than or equal to a given threshold. In this case, the vehicle detecting unit compares, for example, a past position of a vehicle detected in a sensor signal acquired one time before with the present position of a vehicle detected in the latest sensor signal. The vehicle detecting unit determines that the vehicle which exists at the past position that is further from the present position and closest position from the present position is the same as the vehicle which is present at the present position, thereby updating the tracking information for each vehicle. The vehicle detecting unit divides the distance between the present position and the past position by the length of an acquisition cycle of the sensor signal for each vehicle to acquire the speed of the vehicle at the present position.

According to yet another modified example, the deceleration determination threshold $A_{th}$ may be a given value, for example, $-5$ m/sec$^2$. In this case, the deceleration determination threshold $A_{th}$ is stored in the storage unit in advance. As a result, the function of the reference acceleration calculating unit may be missing from the control unit.

For example, when a road near the intersection where the vehicle queue length is to be measured is smooth and there is no factor to stop a vehicle other than the traffic signal installed at the intersection, it is estimated that a vehicle passing through the intersection maintains a constant speed. Therefore, in this case, since it is estimated that a vehicle that is decelerating by a given speed or more stops, the control unit may also determine the deceleration determination threshold $A_{th}$ without depending on a reference acceleration.

According to another modified example, the deceleration determination unit may determine whether the specified vehicle is decelerating even during the green signal period. The stop position estimating unit and the vehicle queue length estimating unit may estimate the stop position of the specified vehicle even during the green signal period and estimate the vehicle queue length according to the estimated stop position. As a result, when a vehicle queue that temporarily stops is generated even during a green signal period by, in particular, traffic congestion, the apparatus for measuring vehicle queue length may measure the vehicle queue length. Furthermore, in the present modified example, the traffic signal interface unit may be omitted in the apparatus for measuring vehicle queue length.

The apparatus for measuring vehicle queue length may estimate the stop position of the specified vehicle and estimate the vehicle queue length according to the estimated stop position without comparing the acceleration with the deceleration determination threshold each time the acceleration of the specified vehicle is acquired. In this case, when the estimated stop position of the specified vehicle is located at the front of the assumed vehicle queue, for example, in front of the stop line, the vehicle queue length estimating unit determines that there is no vehicle queue. However, when the estimated stop position of the specified vehicle is located behind the front of the assumed vehicle queue, the vehicle queue length estimating unit may estimate the vehicle queue length in the same manner as in the illustrative embodiment.

The apparatus for measuring vehicle queue length according to the illustrative embodiments or the modified examples thereof may be installed at an area where a vehicle queue is generated due to the traffic congestion such as, for example, a frequent congestion point of a highway as well as an intersection.

A computer program being described commands that implement the function of the control unit according to the illustrative embodiments or the modified examples in a computer may be provided in the form of a recording medium, such as a magnetic recording medium, an optical recording medium, or a non-volatile semiconductor memory.

A measurement result from the apparatus for measuring vehicle queue length according to the illustrative embodiments or the modified examples thereof may be used in various systems. For example, the measurement result may be used to control the switching timing of a traffic signal control system or to determine whether an anti-collision warning should be issued in a driving support system.

Figure 7:
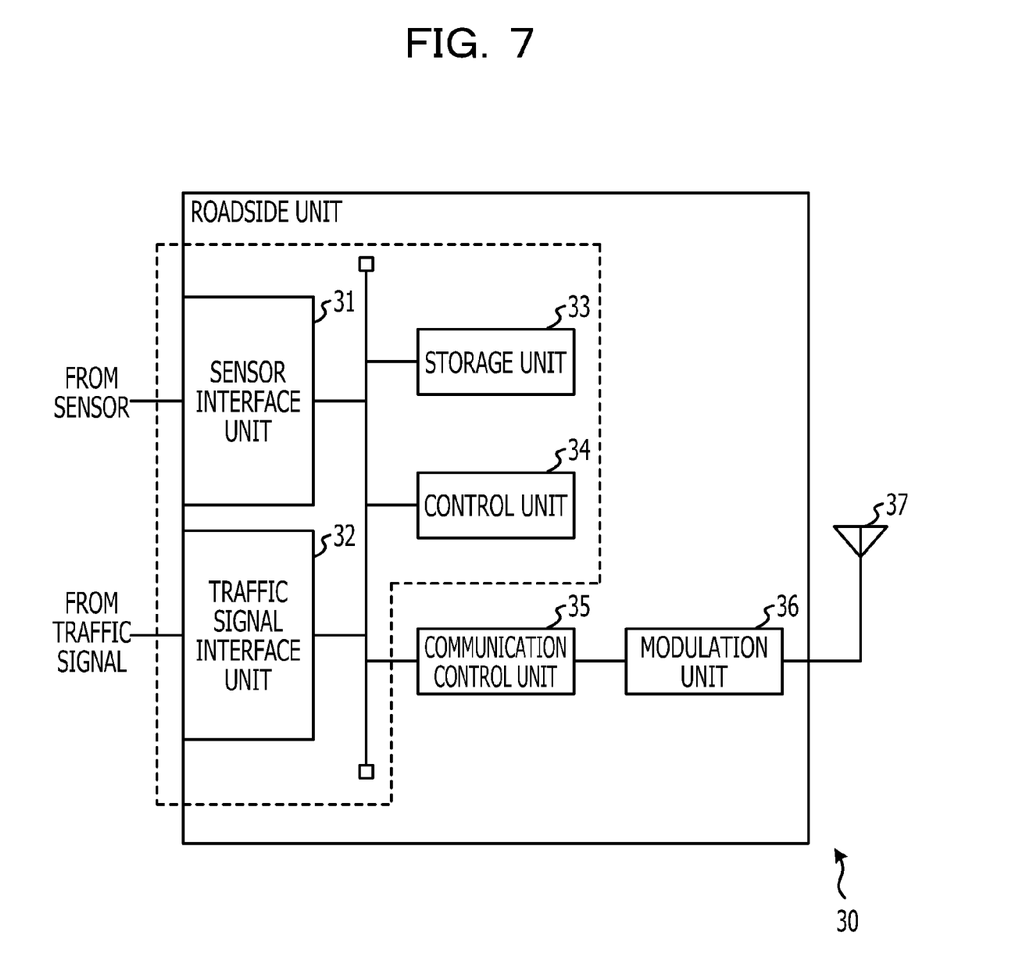
FIG. 7 depicts a schematic diagram illustrating a roadside unit included in the apparatus for measuring vehicle queue length according to the illustrative embodiment.

FIG. 7 depicts a schematic diagram illustrating a roadside unit incorporated with the apparatus for measuring vehicle queue length according to the illustrative embodiment or the modified example thereof.

A roadside unit 30 is installed, for example, near the intersection. A roadside unit 30 is capable of wirelessly communicating with a vehicle communicator installed in a vehicle. The roadside unit 30 detects, for example, the length of a queue of vehicles that stop on the road connected with the intersection, and estimates the stop position of a vehicle that is travelling behind the vehicle queue. The roadside unit 30 then compares the estimated stop position and the vehicle queue length to determine whether there is a risk that the travelling vehicle collides with the vehicle at the tail end of the vehicle queue. Upon determining that there is a risk of collision, the roadside unit 30 transmits a warning signal to the vehicle communicator installed in the travelling vehicle. As a result, the roadside unit 30 includes a sensor interface unit 31, a traffic signal interface unit 32, a storage unit 33, a control unit 34, a communication control unit 35, a modulation unit 36 and an antenna 37.

Each of the sensor interface unit 31, the traffic signal interface unit 32, the storage unit 33 and the control unit 34 corresponds to the sensor interface unit 11, the traffic signal interface unit 12, the storage unit 13, and the control unit 15, respectively, of the apparatus for measuring vehicle queue length according to the illustrative embodiments or the modified examples thereof. That is, in FIG. 7, the portion surrounded by dashed lines corresponds to the apparatus for measuring vehicle queue length.

The sensor interface unit 31 receives the sensor signal from a sensor, such as a radar apparatus or a camera, installed near the intersection, and the control unit 34 determines the specified vehicle based on the sensor signal and estimates the stop position of the specified vehicle in order to acquire the vehicle queue length.

When the vehicle queue length acquired based on the current specified vehicle is shorter than the vehicle queue length acquired based on the previous specified vehicle, the control unit 34 determines that there is a possibility that the specified vehicle may collide with the tail end of the vehicle queue and generates warning information indicating that there is the possibility of collision.

The communication control unit 35 includes at least one processor and a memory circuit, and creates a communication channel with a vehicle mounted communicator that is provided within a communicatable range of the roadside unit 30. Upon receiving the warning information from the control unit 34, the communication control unit 35 generates a notification signal that includes the warning information. The communication control unit 35 performs error correction encoding, such as a turbo encoding, with respect to the notification signal. The communication control unit 35 multiplexes the error correction coded notification signal according to a given multiplexing method such as, for example, an orthogonal frequency division multiplexing (OFDM) method. The communication control unit 35 then outputs the multiplexed notification signal to the modulation unit 36.

The modulation unit 36 converts the notification signal received from the communication control unit 35 into an analog signal. The modulation unit 36 overlaps the analog notification signal with a carrier wave having a radio frequency to generate a radio signal and amplifies the radio signal using a power amplifier. The modulation unit 36 outputs the amplified radio signal to the vehicle communicator (not shown) through the antenna 37.

As described above, the roadside unit 30 may give a warning to a vehicle that may collide with the vehicle queue.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An apparatus for measuring a vehicle queue length comprising:
    a memory; and
    a processor coupled to the memory and configured to:
    detect a moving vehicle as the moving vehicle approaches a vehicle queue based on a signal from a sensor;
    acquire a position and a speed of the moving vehicle based on the signal;
    calculate a stop position of the moving vehicle based on a change in the position and the speed of the moving vehicle; and
    calculate a length of the vehicle queue based on the stop position of the moving vehicle,
    wherein the processor is further configured to calculate another length of another vehicle queue by a sum of a certain distance and the length of the vehicle queue, when another vehicle that follows the moving vehicle is not detected before a given period elapses from the time when the moving vehicle stops or is not detected.

2. The apparatus according to claim 1, wherein the sensor faces a front surface of the moving vehicle and emits the signal.

3. The apparatus according to claim 1, wherein the vehicle queue comprises a plurality of vehicles, and a first vehicle of the plurality of vehicles is obstructed by a second vehicle of the plurality of vehicles.

4. The apparatus according to claim 1, wherein the sensor is installed at an intersection.

5. The apparatus according to claim 1,
    wherein the processor is further configured to:
    calculate an acceleration of the moving vehicle based on the change in the speed of the moving vehicle;
    determine that the moving vehicle is decelerating based on the acceleration, and
    wherein the length of the vehicle queue is calculated when it is determined that the moving vehicle is decelerating.

6. The apparatus according to claim 5,
    wherein the processor is further configured to:
    acquire, from a traffic signal, timing information that indicates a switching timing of the traffic signal;
    specify a movement control period during which the traffic signal prohibit movement of vehicles in the vehicle queue, based on the timing information, and
    wherein the stop position of the moving vehicle is calculated only within the movement control period.

7. The apparatus according to claim 6,
    wherein the processor is further configured to:
    determine a deceleration determination threshold according to the acceleration of the moving vehicle within a movement permission period during which the traffic signal permits movement of the vehicles in the vehicle queue, and
    wherein it is determined that the moving vehicle is decelerating when the acceleration is lower than the deceleration determination threshold.

8. A method for measuring a vehicle queue length comprising:
    detecting a moving vehicle as the moving vehicle approaches a vehicle queue based on a signal from a sensor;
    acquiring a position and a speed of the moving vehicle based on the signal;
    calculating a stop position of the moving vehicle based on a change in the position and the speed of the moving vehicle;
    calculating the length of the vehicle queue based on the stop position of the moving vehicle; and
    calculating another length of another vehicle queue by a sum of a certain distance and the length of the vehicle queue, when another vehicle that follows the moving vehicle is not detected before a given period elapses from the time when the moving vehicle stops or is not detected.

9. The method according to claim 8, wherein the vehicle queue comprises a plurality of vehicles, and a first vehicle of the plurality of vehicles is obstructed by a second vehicle of the plurality of vehicles.

10. The method according to claim 8 further comprising:
    calculating an acceleration of the moving vehicle based on the change in the speed of the moving vehicle;
    determining that the moving vehicle is decelerating based on the acceleration; and
    wherein the length of the vehicle queue is calculated when it is determined that the moving vehicle is decelerating.

11. The method according to claim 10 further comprising:
acquiring, from a traffic signal, timing information that indicates a switching timing of the traffic signal;
specifying a movement control period during which the traffic signal prohibit movement of vehicles in the vehicle queue, based on the timing information; and
wherein the stop position of the moving vehicle is calculated only within the movement control period.

12. The method according to claim 11 further comprising:
determining a deceleration determination threshold according to the acceleration of the moving vehicle within a movement permission period during which the traffic signal permits movement of the vehicles in the vehicle queue; and
wherein it is determined that the moving vehicle is decelerating when the acceleration is lower than the deceleration determination threshold.

13. A non-transitory computer-readable recording medium storing a program for causing a computer to execute a process for measuring a vehicle queue length, the process comprising:
detecting a moving vehicle as the moving vehicle approaches a vehicle queue based on a signal from a sensor;
acquiring a position and a speed of the moving vehicle based on the signal;
calculating a stop position of the moving vehicle based on a change in the position and the speed of the moving vehicle;
calculating the length of the vehicle queue based on the stop position of the moving vehicle; and
calculating another length of another vehicle queue by a sum of a certain distance and the length of the vehicle queue, when another vehicle that follows the moving vehicle is not detected before a given period elapses from the time when the moving vehicle stops or is not detected.

14. The non-transitory computer-readable recording medium according to claim 13, wherein the vehicle queue comprises a plurality of vehicles, and a first vehicle of the plurality of vehicles is obstructed by a second vehicle of the plurality of vehicles.

15. The non-transitory computer-readable recording medium according to claim 13, the process further comprising:
calculating an acceleration of the moving vehicle based on the change in the speed of the moving vehicle;
determining that the moving vehicle is decelerating based on the acceleration; and
wherein the length of the vehicle queue is calculated when it is determined that the moving vehicle is decelerating.

16. The non-transitory computer-readable recording medium according to claim 15, the process further comprising:
acquiring, from a traffic signal, timing information that indicates a switching timing of the traffic signal;
specifying a movement control period during which the traffic signal prohibit movement of vehicles in the vehicle queue, based on the timing information; and
wherein the stop position of the moving vehicle is calculated only within the movement control period.

17. The non-transitory computer-readable recording medium according to claim 16, the process further comprising:
determining a deceleration determination threshold according to the acceleration of the moving vehicle within a movement permission period during which the traffic signal permits movement of the vehicles in the vehicle queue; and
wherein it is determined that the moving vehicle is decelerating when the acceleration is lower than the deceleration determination threshold.

* * * * *